(12) United States Patent
Lawrence et al.

(10) Patent No.: US 10,182,055 B2
(45) Date of Patent: Jan. 15, 2019

(54) SECURITY POLICY EFFICACY VISUALIZATION

(71) Applicant: Cisco Technology, Inc., San Jose, CA (US)

(72) Inventors: Joe Lawrence, East Boston, MA (US); Jason M. Perry, Plymouth, MA (US); Yedidya Dotan, Newton, MA (US); Denis Knjazihhin, Lexington, MA (US); Umesh Kumar Miglani, North Chelmsford, MA (US)

(73) Assignee: Cisco Technology, Inc., San Jose, CA (US)

( * ) Notice: Subject to any disclaimer, the term of this patent is extended or adjusted under 35 U.S.C. 154(b) by 142 days.

(21) Appl. No.: 15/426,702

(22) Filed: Feb. 7, 2017

(65) Prior Publication Data

US 2017/0353459 A1 Dec. 7, 2017

Related U.S. Application Data

(60) Provisional application No. 62/346,042, filed on Jun. 6, 2016.

(51) Int. Cl.
*G06F 17/00* (2006.01)
*H04L 29/06* (2006.01)

(52) U.S. Cl.
CPC .......... *H04L 63/10* (2013.01); *H04L 63/0263* (2013.01); *H04L 63/20* (2013.01)

(58) Field of Classification Search
USPC .......................................................... 726/1
See application file for complete search history.

(56) References Cited

U.S. PATENT DOCUMENTS 6,807,576 B1 * 10/2004 Jeffries ................... H04L 29/06
707/999.002
7,003,562 B2 2/2006 Mayer
(Continued)

FOREIGN PATENT DOCUMENTS

WO 00/78004 A2 12/2000

OTHER PUBLICATIONS

S. Wendzel, et al., "Design and Implementation of an Active Warden Addressing Protocol Switching Covert Channels", ICIMP 2012: The Seventh International Conference on Internet Monitoring and Protection, May 28, 2012, ISBN: 978-1-61208-201-1, 6 pages.
(Continued)

*Primary Examiner* — Amare F Tabor
(74) *Attorney, Agent, or Firm* — Edell, Shapiro & Finnan, LLC

(57) ABSTRACT

A management entity communicates over a network with devices on which security rules are configured to control network access. Data that indicates a hit count for each security rule across the devices is repeatedly collected from the devices. The indicated hit counts for each security rule are aggregated over different repeating time intervals to produce repeatedly aggregated hit counts for respective ones of the different repeating time intervals. The security rules are generated for display on a user interface screen as selectable options. Responsive to a selection of one of the security rules, a selected security rule and most recently aggregated hit counts for the different repeating time intervals for the selected security rule are generated for concurrent display on the user interface screen. The display of the most recently aggregated hit counts for the selected security rule is updated as time progresses.

20 Claims, 15 Drawing Sheets

(56) References Cited

U.S. PATENT DOCUMENTS

| | | | |
|---|---|---|---|
| 7,146,639 | B2 | 12/2006 | Bartal et al. |
| 7,472,412 | B2 | 12/2008 | Wolf et al. |
| 7,499,910 | B2* | 3/2009 | Schneider ......... G06F 17/30483 |
| 8,019,764 | B1* | 9/2011 | Nucci ................. G06F 17/3089 707/739 |
| 8,256,002 | B2 | 8/2012 | Chandrashekhar et al. |
| 8,392,421 | B1* | 3/2013 | Nucci ................. G06F 17/3089 707/739 |
| 9,043,464 | B1 | 5/2015 | Trainor et al. |
| 9,128,605 | B2 | 9/2015 | Nan et al. |
| 9,256,686 | B2 | 2/2016 | Woodruff |
| 9,400,995 | B2 | 7/2016 | Gu et al. |
| 9,553,845 | B1* | 1/2017 | Talmor ................ H04L 63/0263 |
| 2004/0260818 | A1 | 12/2004 | Valois et al. |
| 2005/0273859 | A1 | 12/2005 | Chess et al. |
| 2006/0053389 | A1 | 3/2006 | Michelman |
| 2008/0301218 | A1 | 12/2008 | Mukherjee et al. |
| 2009/0073891 | A1 | 3/2009 | Duffield et al. |
| 2010/0005505 | A1 | 1/2010 | Gottimukkala et al. |
| 2014/0109177 | A1 | 4/2014 | Barton et al. |
| 2015/0128116 | A1 | 5/2015 | Chen et al. |

OTHER PUBLICATIONS

Juniper networks: "Security Director Application Guide", Feb. 25, 2015, XP55311738, Retrieved from the Internet: URL:http://www.junipernet/techpubs/en_US/junos-space14.1/information-products-pathway-pages/junos-space-security-director-pwp.pdf (retrieved on Oct. 18, 2016), pp. 1-100.

Juniper networks: "Security Director Application Guide", Feb. 25, 2015, XP55311738, Retrieved from the Internet: URL:http://www.juniper.net/techpubs/en_US/junos-space14.1/information-products/pathway-pages/junos-space-security-director-pwp.pdf (retrieved on Oct. 18, 2016), pp. 101-200.

Juniper networks: "Security Director Application Guide", Feb. 25, 2015, XP55311738, Retrieved from the Internet: URL:http://www.juniper.net/techpubs/en_US/junos-space14.1/information-products/pathway-pages/junos-space-security-director-pwp.pdf (retrieved on Oct. 18, 2016), pp. 201-300.

Juniper networks: "Security Director Application Guide", Feb. 25, 2015, XP55311738, Retrieved from the Internet: URL:http://www.juniper.net/techpubs/en_US/junos-space14.1/information-products/pathway-pages/junos-space-security-director-pwp.pdf (retrieved on Oct. 18, 2016), pp. 301-400.

Juniper networks: "Security Director Application Guide", Feb. 25, 2015, XP55311738, Retrieved from the Internet: URL:http://www.juniper.net/techpubs/en_US/junos-space14.1/information-products/pathway-pages/junos-space-security-director-pwp.pdf (retrieved on Oct. 18, 2016), pp. 401-500.

Juniper networks: "Security Director Application Guide", Feb. 25, 2015, XP55311738, Retrieved from the Internet: URL:http://www.juniper.net/techpubs/en_US/junos-space14.1/information-products/pathway-pages/junos-space-security-director-pwp.pdf (retrieved on Oct. 18, 2016), pp. 501-596.

Richard J. MacFarlane, "An Integrated Firewall Policy Validation Tool", A thesis submitted in partial fulfilment of the requirements of Edinburgh Napier University for the Degree of Master of Science, in the Faculty of Engineering, Computing & Creative Industries, Sep. 2009, 148 pages.

G. Cormode et al., "Finding Hierarchical Heavy Hitters in Streaming Data", ACM Transactions on Database Systems, vol. V, No. N, Oct. 2007, 43 pages.

* cited by examiner

| Diff | SYNCED | | | Edit | Default |
|---|---|---|---|---|---|
| | 128 | access-list partners_in extended permit ip object-group partner_nets object-group customers_facing_hosts log | | | |
| | 129 | access-list partners_in extended deny ip any any log | | | |
| | ... | | | | |
| | 130 | access-list outside_in extended deny ip object-group bad_actors any log | Hit Count: Low | Volume: High | |
| | 131 | access-list outside_in extended permit ip any any log | | | |
| | 132 | pager lines 24 | | | |
| | 133 | logging enable | | | |
| | 134 | logging console errors | | | |
| | ... | | | | |

FIG.10

| Devices & Services | | | | | |
|---|---|---|---|---|---|
| Filter — 1205 | Policies ▼  Objects  Templates  Monitoring ▼ | | | | ☐ ☐ ☒ |
| ☐ Service Types ▶ | Application Policies  (Domain / IP Address) | | — 1210 | | User1 Home — 1215 |
| ☐ FirePOWER | DEVICE/SERVICE NAME ⬍ | DEVICE/SERVICE TYPE ⬍ | ACTION ⬍ | STATUS ⬍ | Resource |
| ☐ OpenDNS | 10.82.109.150 FirePOWER | FirePOWER | Allow | Synced | Resource Type  Domain / IP Address |
| ☐ FTD | CloneForMaor | FirePOWER | Allow | Synced | Rule Action  Block ▶ |
| ☐ Rule Actions ▶ | User1 Home — 1222 | FTD | Block | Synced | Identities ▶ |
| ☐ Allow | | | | | |
| ☐ Monitor | | • • • | | | • • • |
| ☐ Warn  1220 | | | | | |
| ☐ Scan | | | | | Hits ▶ |
| ☐ Authenticate | | | | | Hourly hits on device for last: — 1230 |
| ☐ Anonymize | | | | | Day ☐ ☐ ☐ ☐ ☐ |
| ☐ Block | | | | | Week ▬<100 ☐ ☐ ☐ ☐  Month ▬<100 ☐ ☐ ☐ ☐  Year ▬<100 ☐ ☐ ☐ ☐ |

SECURITY POLICY EFFICACY VISUALIZATION

PRIORITY CLAIM

This application claims priority to U.S. Provisional Application No. 62/346,042, filed Jun. 6, 2016, the entirety of which is incorporated herein by reference.

TECHNICAL FIELD

The present disclosure relates to managing network security devices.

BACKGROUND

Some network security devices generate reports as to what action the network security products are blocking or allowing according to network security rules configured on the network security devices. In a network that has numerous network security devices of various vendors, it can become cumbersome to configure and monitor the activity of each individual network security device. Also, there is no known capability by which a network administrator is able to visualize how effective the network security rules are or why a given network security rule is configured on a given network security device. Moreover, the generated reports only contain data that represents a snapshot in time, do not provide context to the time frame in which the data was collected, and do not provide real-time updates to the data.

BRIEF DESCRIPTION OF THE DRAWINGS

FIG. 10 shows a fourth UI screen that shows policy efficacy in an in-line editor, displayed in connection with operations performed in the method of FIG. 5, according to an example embodiment.

FIG. 12 shows a sixth UI screen that shows policy efficacy displayed in connection with operations performed in the method of FIG. 5, according to an example embodiment.

DESCRIPTION OF EXAMPLE EMBODIMENTS

Overview

A management entity is configured to communicate over a network with devices on which security rules are configured to control network access. Data that indicates a hit count for each security rule across the devices is repeatedly collected from the devices. The hit count for each security rule is a number of times each security rule is triggered to control network access across the devices. The hit counts for each security rule are aggregated over different repeating time intervals to produce repeatedly aggregated hit counts for respective ones of the different repeating time intervals. The security rules are generated for display on a user interface screen as selectable options. Responsive to a selection of one of the security rules, a selected security rule and most recently aggregated hit counts for the different repeating time intervals for the selected security rule are generated for concurrent display on the user interface screen. The display of the most recently aggregated hit counts for the selected security rule are updated as time progresses. The operations that generate for display on the user interface screen are performed concurrent with the operations that repeatedly collect and aggregate.

Example Embodiments

Figure 1:
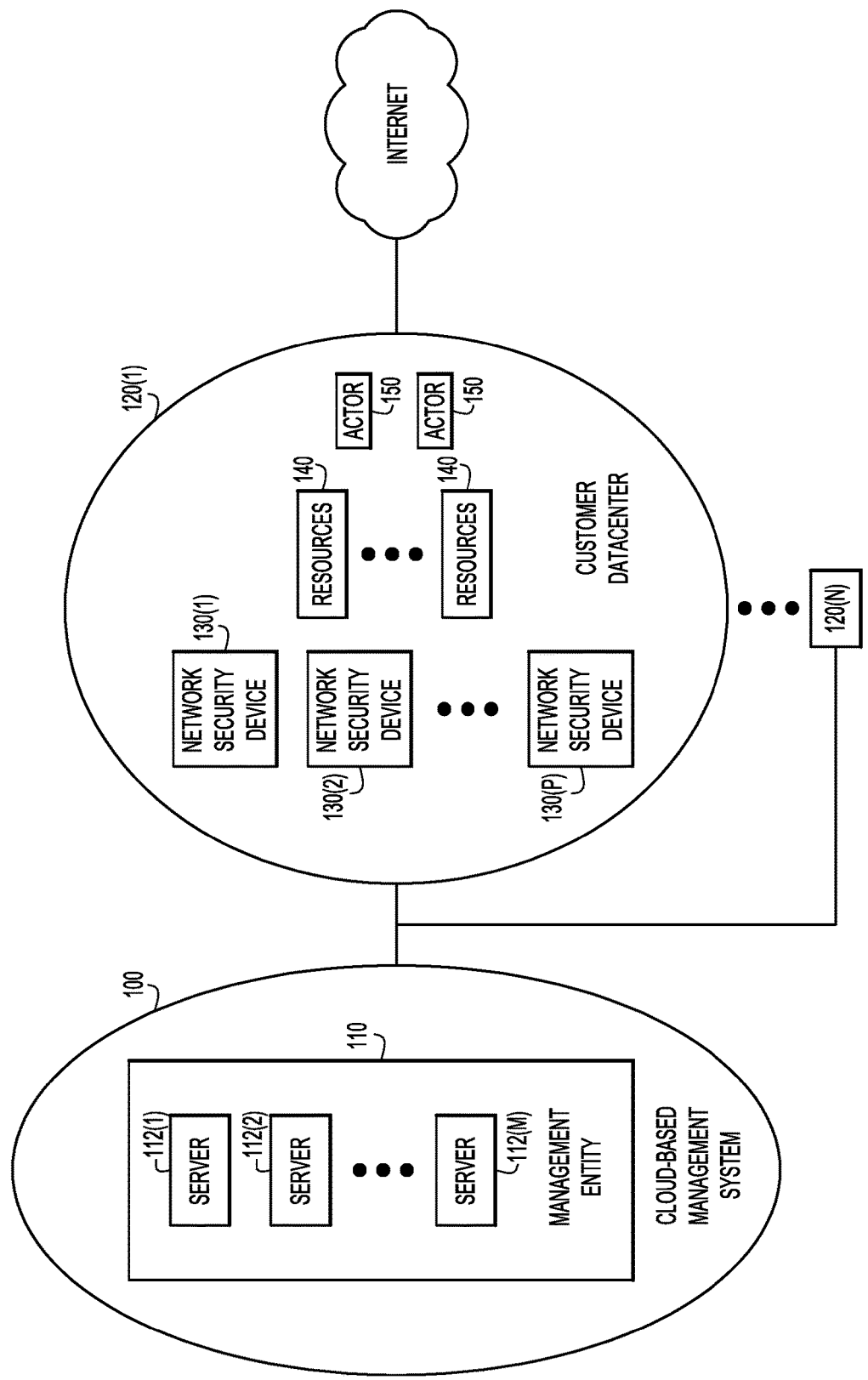
FIG. 1 is a block diagram of a cloud-based management system according to an example embodiment.

Referring first to FIG. 1, a cloud-based management system 100 is shown that connects to and communicates with network security devices in customer datacenters and networks. FIG. 1 shows the details of a customer datacenter 120(1), but it should be understood that cloud-based management system 100 may connect and communicate with multiple customer datacenters 120(1)-120(N) as shown in FIG. 1.

The cloud-based management system 100 includes a management entity 110 that includes one or more computer servers 112(1)-112(M) that execute software to perform the operations described throughout this disclosure. An example of a hardware configuration for the management entity 110 is described in more detail below in connection with FIG. 15.

The customer datacenters 120(1)-120(N) each includes a plurality of network security devices or products, shown at reference numerals 130(1)-130(P) and collectively referred to as security devices 130. Within a customer datacenter there are one or more resources 140 and one or more actors 150. The resources 140 may include servers, databases, and the actors 150 are users or processes using a computing device (personal computer, SmartPhone, etc.) that may seek access to one or more of the resources 140. The resources and actors may also reside outside the customer datacenter itself, e.g., in the Internet. Network security devices 130 control access of the actors 150 to the resources 140 according to policies, i.e., a set of one or more rules configured on the respective network security devices.

As explained above, the network security devices 130 may be of different types, e.g., applications security appliances (ASAs) and firewalls, from the same or different vendors of network security products. Management entity 110 centralizes and unifies the management of network security policies across the plurality of network security devices 130 to simplify network security management in a customer datacenter. One of the functions of the network security devices 130 may be, for example, to control access to and from the Internet, as shown in FIG. 1.

Figure 2:
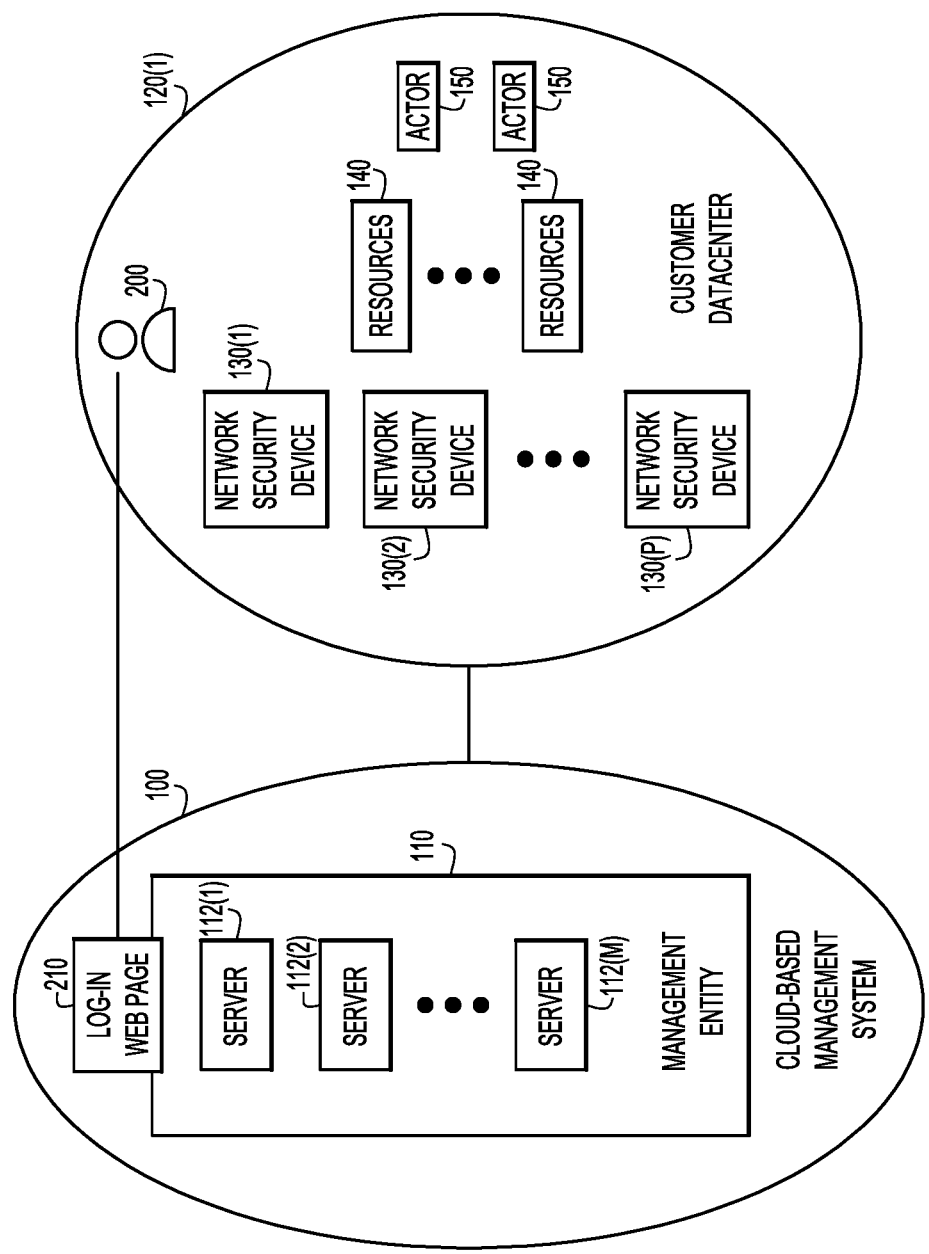
FIG. 2 is a block diagram similar to FIG. 1, but showing how a user interacts with the cloud-based management system according to an example embodiment.

FIG. 2 shows how a user (network administrator) may initiate an on-board operation and interact with the cloud-based management system to manage network security devices 130. FIG. 2 shows the network administrator at reference numeral 200 logging on to a log-on web page 210 served by one of the servers 112(1)-112(M) of management entity 110. The log-on web page 210 allows the network administrator to set up privileges to permit management entity 110 to communicate, over the Internet, into customer datacenter 120(1) in order to connect to network security devices 130. In addition, during the initial log-in and setup phase, the network administrator provides names and address (e.g., Internet Protocol (IP) addresses) for each of the network security devices in the customer datacenter. Other types of set-up processes may be used other than use of a log-on web page.

Next, management entity 110 discovers network security devices 130 and imports the policies from each of the network security devices. Briefly, this involves sending a connection string and device type tag to each network security device. Each network security device responds with device descriptor and policy data for each network security rule configured on the respective network security device. An example of the policy data imported form a security device may be:
  a. Protocol: HTTPS
  b. Network: All
  c. Destination: 132.180.0.0/24
  d. Description: Web
  e. Policy: On
  f. Logging: On Thereafter, the network administrator can configure security polices across the security devices, instead of having to separately configure each security device.

Figure 3:
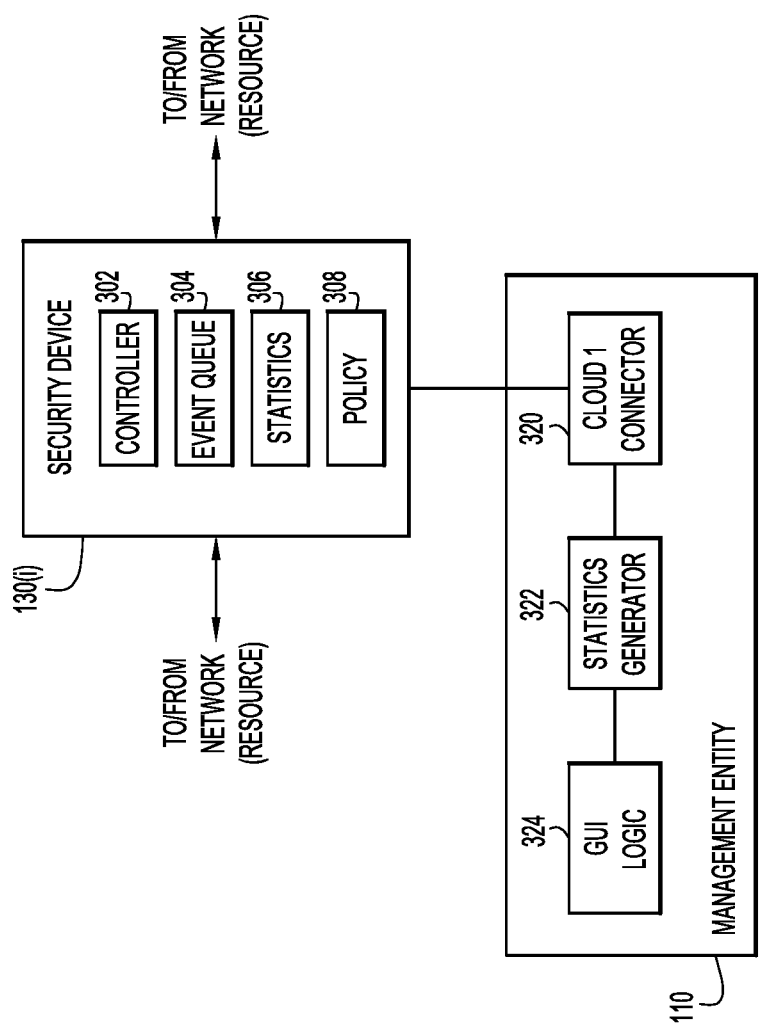
FIG. 3 is a block diagram of a management entity in the cloud-based management system and a security device managed by the management entity according to an example embodiment.

With reference to FIG. 3, there is a simplified block diagram of management entity 110 and a security device 130(i) representative of any of security devices 130. Security device 130(i) includes a controller 302, an event queue 304, and a statistical engine 306. Security device 130(i) controls and monitors network traffic flowing (or attempting to flow) between network accessible "entities" or "resources" (e.g., "resources" and "actors" shown in FIGS. 1 and 2) that may be accessed through/via the security device based on security rules of a policy 308 configured on/implemented by the security device. Network accessible entities/resources include, without limitation, cloud-based services, servers, client devices, and applications hosted on computer devices. Typically, each network access (referred to as an "event") triggers one or more associated security rules in policy 308 that handle the event, e.g., permit access, deny access, monitor access, and so on. The events/network accesses, include, for example, client requests originated at clients destined for servers, and server responses originated at servers and destined for clients. In an example, the client/server requests/responses may be Hypertext Transfer Protocol (HTTP) requests/responses.

Security device 130(i) logs/stores information related to the events/network accesses in event queue 304, i.e., the security device logs the events in the event queue. Security device 130(i) may log thousands of events per second. The logged events include information indicative of the security rules that were triggered or encountered in security device 130(i) to handle those events. Event queue 314 may be configured as a first-in-first-out (FIFO) in which new/incoming events overwrite previously logged events when the FIFO is full. Thus, the event queue contains only most recent events. An example event stored in event queue 314 (i.e., a logged event) is shown in FIG. 4, described below.

Security device 130(i) also includes statistical engine 306 to generate statistics based on the logged events. Statistical engine 306 generates and maintains counts of key performance indicators (KPIs) related to the logged events based on, or including:
  a. Network connections (including source and destination sides of the connections).
  b. User activity per user and user group.
  c. Applications and protocols of network traffic.
  d. Traffic volumes associated with events/network accesses.
  e. Hit counts as how many times each security rule is triggered in the security device over a given time period.

Management entity 110 includes multiple interconnected logic modules/processes to collect and analyze event logs from security devices 130, and present/display analysis results to visualize policy efficacy. The modules/processes include: a Cloud Connector 320 to collect logged events from security devices 130 (e.g., security device 130(i)) over a network; a statistics generator 322 to generate statistics based on the collected logs; an application including graphical user interface (GUI) logic 324 to display policies and the statistics on interactive UI screens and permit a user to interact with the various displayed policies. The operation of management entity 110 is described below in connection with FIG. 5.

Figure 4:
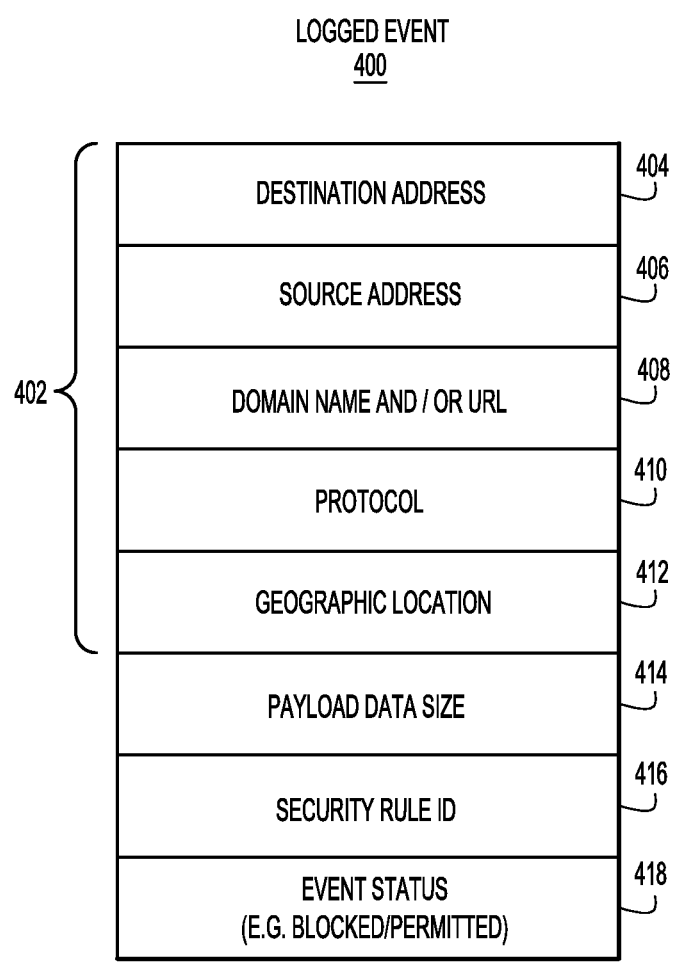
FIG. 4 is an illustration of an event logged by the security device for a network access according to an example embodiment.

With reference to FIG. 4, there is an illustration of an example (logged) event 400 stored in event queue 304 of security device 130(i) for a network access. Event 400 may include information 402 from a header of a data packet (e.g., from an Internet Protocol (IP) packet header) to which the event relates, such as a network destination address 404 (e.g., an IP destination address), a network source address 406 (e.g., an IP source address), a network domain name and/or a network Uniform Resource Locator (URL) 408, a network protocol 410, geographical locations 412 associated with the network addresses 404 and 406, and a data size 414 of a data payload associated with the network access for the event. Event 400 may optionally include an identifier (ID) or name 416 (which may include a line number) of a security rule that was triggered to handle the event, and an event/access status 418 that resulted from application of the security rule, such as a blocked or a permitted access, and so on. A given network accessible entity, such as a server, service, client device, and the like may be represented or indicated by one or more of the descriptors of event 400, including network addresses 404 and 406, domain name and/or URL 408, and geographical location 412. The event 400 may include only a subset of the information indicated in FIG. 4, or information that is different from the information that is shown.

Figure 5:
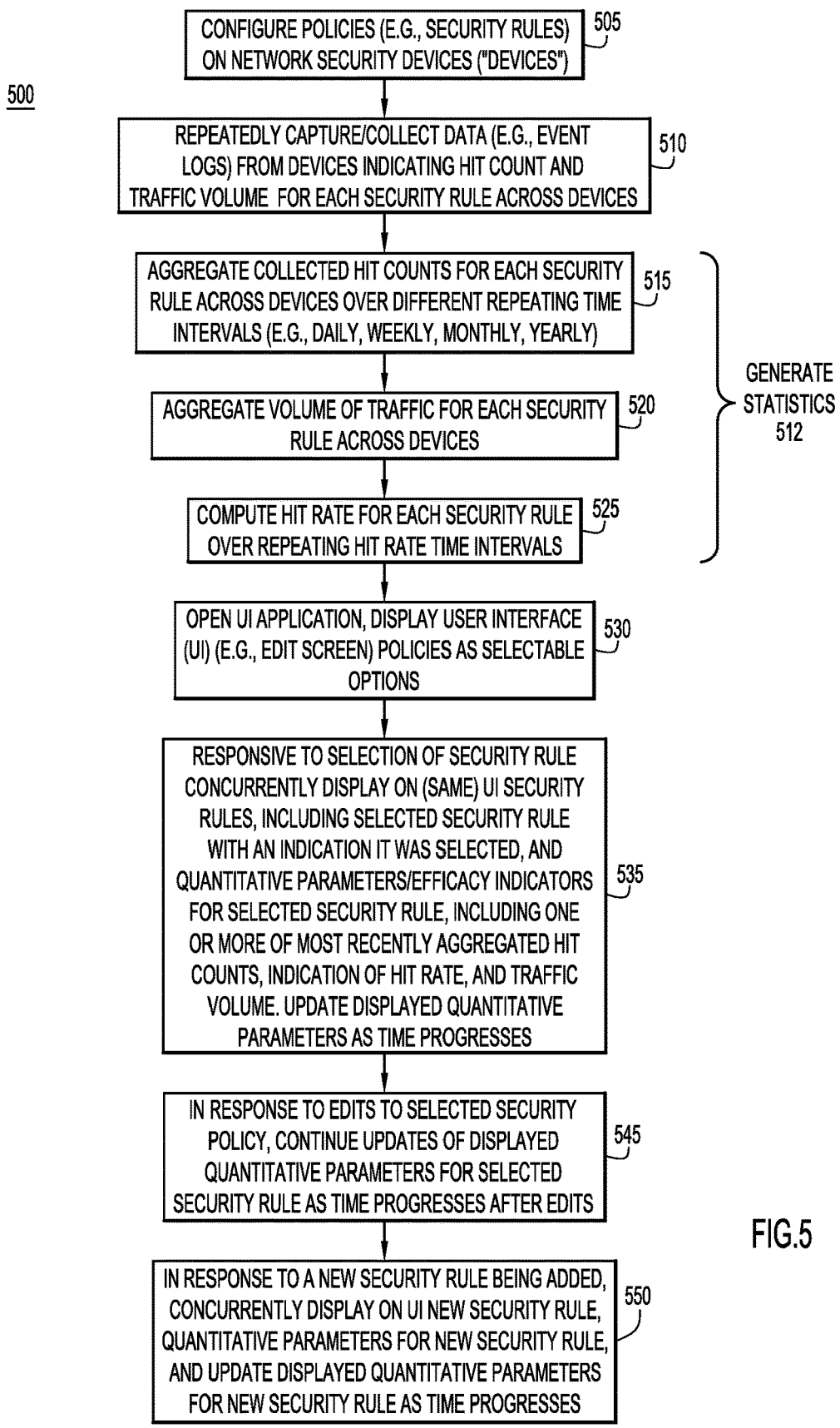
FIG. 5 is a flowchart of a method of collecting and analyzing events from security devices, and presenting results of the analysis to visualize security policy efficacy/behavior, according to an example embodiment.

With reference to FIG. 5, there is a flowchart of an example method 500 of collecting and analyzing events from security devices 130, and presenting results of the analysis to visualize security policy efficacy/behavior, performed by management entity 110. As described above, management entity 110 communicates with security devices 130 over a network. Each of security devices 130 stores in a respective event queue events for network traffic attempting to flow through or actually flowing through the security device to and from entities/resources over the network. Each stored event is indicative of a security rule triggered to handle the event and may include additional data (also referred to as metadata) related to the security rule.

At 505, management entity 110 configures security policies across security devices 130. Each security policy includes a set of security rules to control and/or monitor network accesses made or attempted to be made through the security device on which the security policy is configured. The security policies (referred to simply as "policies") may be downloaded to and configured on security devices 130 via a configure security device UI screen presented by management entity 110.

At 510, management entity 110 (e.g., cloud connector 320) periodically collects/captures from the event queues across security devices 130 the logged events (i.e., event logs), such as logged event 400. The collected data may also include information generated by respective statistics generators 306 in security devices 130. The data/information included in the logged events indicates which security rules were triggered to handle the events, how many times each security rule was triggered in a window of time captured by the event queues, and the metadata associated with the triggered security rule, similar to that shown in logged event 400. Thus, the captured event logs indicate a total number of times each of the security rules configured across security devices 130 was triggered. The number of times each security rule was triggered is referred to as a "hit count" for the corresponding security rule across all of network devices 130. The captured event logs also indicate a traffic volume (i.e., amount of data) associated with each event. The traffic volume is indicated by the payload data size 414 included in each event log corresponding to a network access in which data was transferred across a network.

At 512, management entity 110 (e.g., statistics generator 322) identifies the triggered security rules indicated in the collected event logs and repeatedly/periodically generates statistics (referred to as "quantitative parameters" and "efficacy parameters") for each of the security rules based on the information in the event logs as time progresses. The security rules may be identified to management entity 110 explicitly in the logged events, e.g., in event field 416. In addition and/or alternatively, management entity 110 may infer which security rule was triggered in connection with a given event based on a comparison of information in the event log, such IP addresses, protocol indications, success or failure indicators, and so on, against similar rule parameters of known security rules stored by the management entity and known to be configured on security devices 130. Operation 512 operates concurrently with user interface-based operations 530-550 (and operations 605 and 610 of FIG. 6) described below. Thus, operation 512 is considered to be a concurrent background operation with respect to operations 530-550 (and operations 605 and 610), and is thus able to provide periodically updated statistics to operations 530-550 for display over time. Operation 512 includes further operations 515-525 now described.

At 515, management entity 110 aggregates the periodically collected hit counts (as indicated in the periodically collected logged events) for each security rule over different, time overlapping, repeating time intervals, to produce repeatedly aggregated hit counts for respective ones of the different repeating time intervals. For example, management entity 110 aggregates hit counts for each security rule across security devices 130 on hourly, daily, weekly, monthly, and yearly intervals, to produce aggregated hit counts per hour, per day, per week, per month, and per year. In an example, management entity 110 generates a histogram of hit counts for each security rule on a per day basis, rolls the per day histogram into a per week histogram, rolls the per week histogram into a per month histogram, and so on.

At 520, management entity 110 also aggregates traffic volume for/associated with each security rule (as indicated in the periodically collected logged events) across security devices 130.

At 525, management entity 110 repeatedly computes a hit rate for each security rule as a hit count for the security rule over each of repeating hit rate time intervals, to produce a respective hit rate for each of the repeated hit rate intervals. Each hit rate interval may be relatively short, e.g., two or three minutes. For example, assume management entity 110 collects first, second, third, and fourth successive hit counts for a security rule across security devices in first, second, third, and fourth successive hit rate time intervals, respectively. Then, management entity 110 computes first, second, third, and fourth successive hit rates, as the first hit count/the first hit rate time interval, the second hit count/the second hit rate time interval, the third hit count/third hit rate time interval, and the fourth hit count/the fourth hit rate time interval, respectively, and so on as time progresses. Thus, management entity 110 computes a history of hit rate (i.e., as series of hit rates) for each security rule as time progresses. Management entity 110 also computes and tracks a change in the hit rate, from one hit rate to the next hit rate, as time progresses.

The security rules identified in operation 512 may be relatively low-level security rules, such as layer 3 security rules, including associated low-level security rule objects (e.g., IP addresses, port descriptors, and so on). Additionally, the security rules may include relatively high-level rules, such as layer 7 rules, including associated high-level security rule objects, such as domain names, categories of domains, reputations, and so on. The event log collection and statistics generation, including aggregation techniques, describe above may be applied both to the relatively low-level and the relatively high-level security rules and associated objects. A given relatively high-level rule (or security object) when triggered may cause one or more implicit relatively low-level rules associated with the given high-level rule to be triggered also. For example, a security rule to prevent traffic to any gambling website would implicitly include security rules governing specific websites. Thus, the aggregation techniques presented herein coalesce/combine aggregated hit counts for relatively low-level rules implicit to a given relatively high-level rule associated with the relatively low-level rules into the aggregated hit count for the given relatively high-level rule.

The operations performed at 530-550 (and 605 and 610 of FIG. 6) described below may be performed by GUI logic 324 in management entity 110 or a remote computer connected to the management entity via a network, and generate for display various UI screens (including UI elements, features, and objects) that are displayed on one or more UI screens associated with the management entity or the remote computer.

At 530, responsive to user input (i.e., upon receiving the user input), management entity 110 opens/executes a network management application (including GUI logic 324) hosted on a server of the management entity. The network management application (more simply referred to as "the application") is an interactive UI-based application with which a network administrator may interact to configure policies, edit policies, and visualize network policy efficacy in the form of security rule aggregated hit counts, hit rates, and traffic volumes. Once the application is opened/executed, management entity 110 (i.e., via the application executing on the management entity) generates for display and/or displays an interactive UI screen on a computer display of/associated with management entity 110. The UI screen may be an edit screen through which the network administrator may add, edit, and monitor network polices implemented on security devices 130. The UI screen presents a list of security rules configured across security devices 130. The UI screen presents the security rules as user selectable options.

At 535, responsive to a selection of one of the displayed security rules (referred to as the "selected security rule") (i.e., upon receiving the selection), management entity 110 generates for concurrent display and/or concurrently displays on the UI screen the security rules, including the selected security rule flagged to indicate its selection (e.g., the selected security rule may be highlighted), and one or more of the following quantitative parameters (i.e., efficacy parameters) generate at statistics generation operation 512 for the selected security rule:

a. Most recently aggregated hit counts for the different repeating time intervals (e.g., most recently aggregated hit counts per day, per week, per month, and per year). Management entity 110 may also determine whether the aggregated hit counts for the different repeating time intervals for the selected security rule exceed respective predetermined hit count thresholds, and may generate for display and/or display on the UI screen a high or a low (hit count) indicator when the corresponding hit count is determined to be above or below/equal to the hit count threshold, respectively.
  b. An indication of the hit rate, including a most recently computed hit rate and a history of the hit rate (e.g., a graphical illustration of the history as a timeline of hit rates). Changes in the hit rate may also be indicated. Management entity 110 may also determine whether the hit rate computed for each hit rate interval for the selected security rule is equal to/below a predetermined hit rate threshold, and may generate for display and/or display on the UI screen a low or a high (hit rate) indicator when the hit rate is determined to be equal to/below or above the hit rate threshold, respectively; and
  c. The aggregated volume of network traffic associated with the selected security rule. Management entity 110 may also determine whether the aggregated traffic volume exceeds a predetermined traffic volume threshold and may generate for display and/or display on the UI screen a high or a low (traffic volume) indicator when the traffic volume is determined to be above or below/equal to the traffic volume threshold, respectively.

Management entity 110 repeatedly updates on the UI screen the concurrently displayed quantitative parameters as time progresses based on updates of the quantitative parameters generated from operations 510-525 which execute concurrently with operation 530. That is, operations 510-525 communicate the updates to the display operations as soon as the updates are available, and the display operations immediately update the UI screen. In this way, the UI screen presents real-time information, i.e., information that results from the collection and analysis of event logs performed concurrently with the UI display operation, without requiring repetitive input from the user, such as screen refresh or reload commands from the user.

As mentioned above, the network administrator may edit security policies via the UI screen.

At 545, management entity 110 receives edits to the selected security rule through the UI screen. After receiving (and making) the edits, management entity 110 continues to update the displayed quantitative parameters for the selected (now edited) security rule as time progresses.

At 550, management entity 110 receives edits to add a new security rule to targeted security devices among security devices 130. Management entity 110 generates for display and/or displays the new security rule on the UI screen and configures the targeted security devices with the new security rule. For example, management entity 110 downloads the new security rule to the targeted security devices, which then implement the new security rule. Background/concurrent operations 510-525 generate new quantitative parameters for the new security rule. Management entity 110 generates for concurrent display and/or concurrently displays on the UI screen the new security rule and the new quantitative parameters as similarly done in operation 535. Management entity 110 continues to update the displayed quantitative parameters for the new security rule as time progresses.

As described above, operations 530-550 include displaying security rules, selecting a security rule among the displayed security rules, and displaying efficacy information for the selected security rule. Other embodiments include displaying multiple security rules and displaying efficacy information for each of the displayed rules without performing any selecting action.

Figure 6:
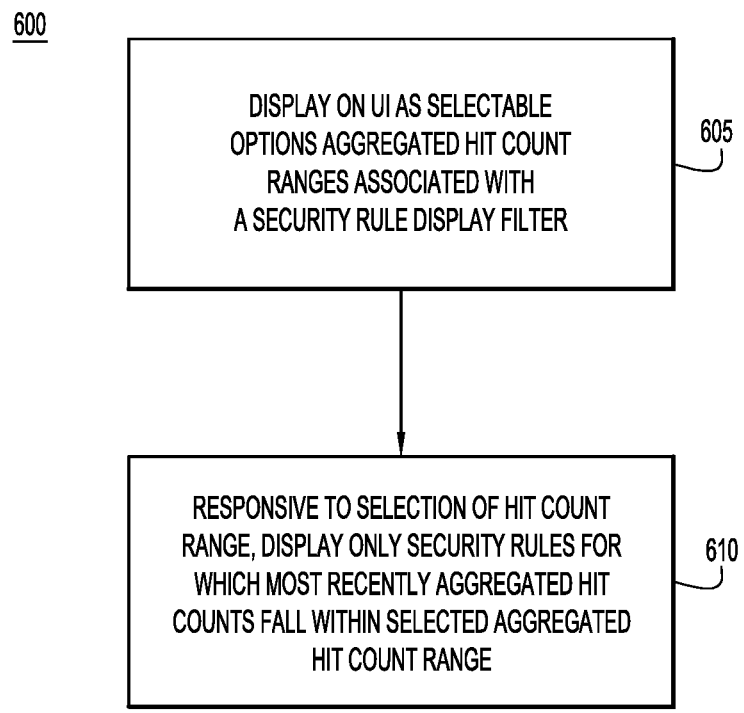
FIG. 6 is a flowchart of a method of filtering security policies that are displayed on a user interface (UI) screen, according to an example embodiment.

With reference to FIG. 6, there is a flowchart of an example method 600 of filtering security rules that are displayed on the UI screen described above, performed by management entity 110.

At 605, management entity 110 generates for display and/or displays on the UI screen as selectable options different aggregated hit count ranges associated with a security rule display filter, e.g., on a security rule filter panel of the UI screen.

At 610, responsive to a selection of one of the different hit count ranges (i.e., upon receiving the selection), management entity 110 generates for display and/or displays on the UI screen only security rules for which currently aggregated hit counts fall within the selected aggregated hit count range.

Figure 7:
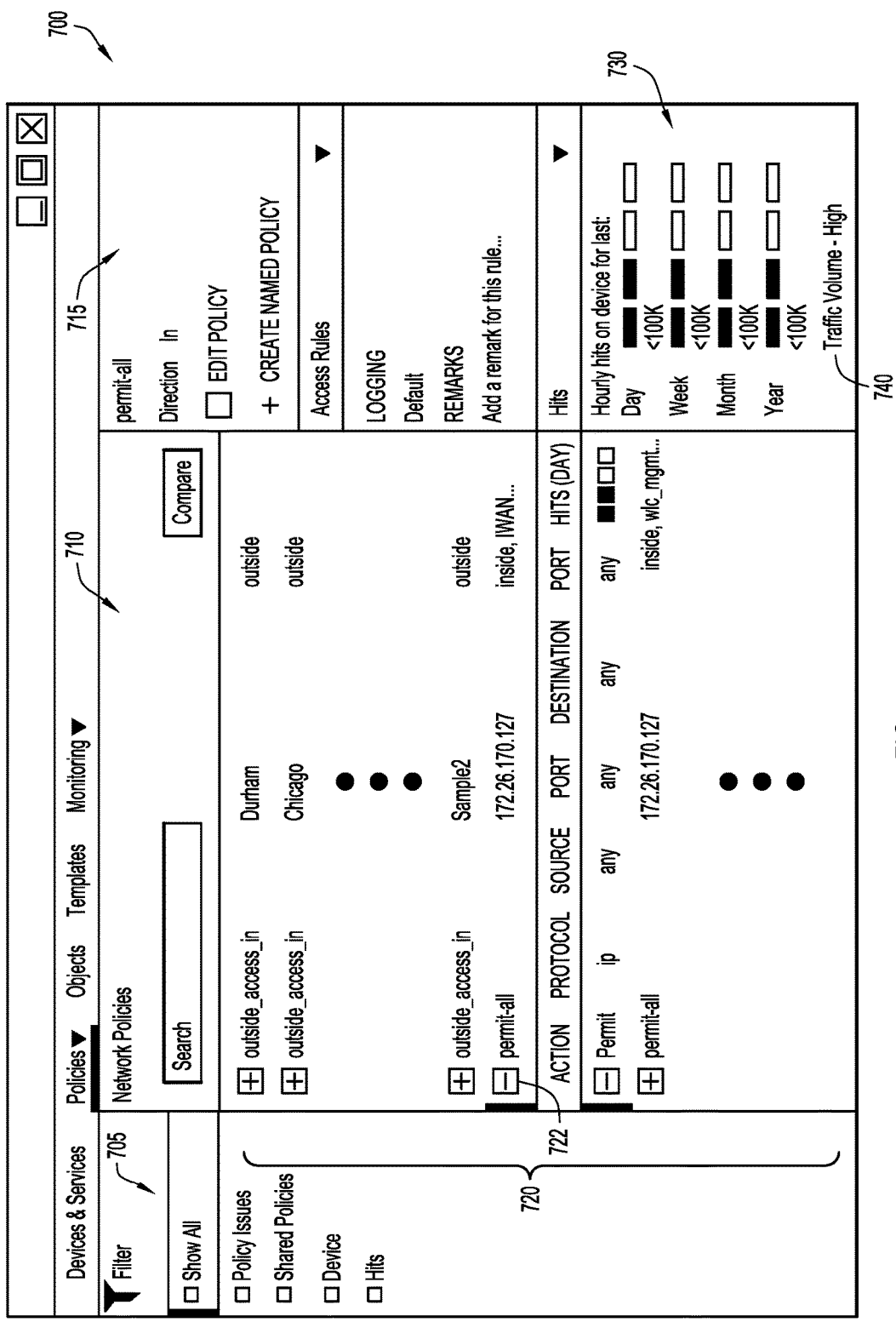
FIG. 7 shows a first UI screen that shows policy efficacy including hit counts, displayed in connection with operations performed in the method of FIG. 5, according to an example embodiment.

With reference to FIG. 7, there is shown an example UI screen 700 for visualizing security rule efficacy that may be displayed in connection with display operations 530-550. UI screen 700 includes a left panel 705, a center panel 710, and a right panel 715. Panel 705 presents a security rule display filter. Panel 710 presents various security rules 720 as layer 3 access control lists (ACLs) configured on different security devices. Each layer 3 security rule typically includes a set of rule parameters including a security rule name/identifier identifying the security rule, a rule action (e.g., permit or deny), a network protocol, source and destination addresses (e.g., IP addresses, objects, or an object group), and a device port. Thus, the security rule controls access to a resource or resources based on the network protocol, the source and destination addresses, and the device port.

Each of security rules 720 is selectable via UI screen 700. A security rule 722 is highlighted to indicate it has been selected. In response to the selection, panel 715 presents a hits section 730 that presents most recently aggregated hit counts for the selected security rule per day, per week, per month, and per year. The aggregated hit counts are hit counts that are aggregated across all of the security devices on which the selected rule is configured as indicated in the event logs collected from the security devices. Hits section 730 also presents a traffic volume indicator 740. In the example, traffic indicator 740 indicates that the traffic volume for the selected rule is "High" because it exceeds the predetermined traffic volume threshold. In other example, the traffic volume may be indicated quantitatively/numerically.

The hit counts and traffic volume presented on UI screen 700 gives a network administrator hints and cues before taking action to edit selected security rule 722. Although security rules 720 are shown as layer 3 access list, higher level security policy objects may also be shown. Thus, the aggregation techniques may be applied to both the access lists and the higher level security objects. Also, the techniques permit display of the higher level objects, and support a pivot into a more detailed view for further investigation.

Figure 8:
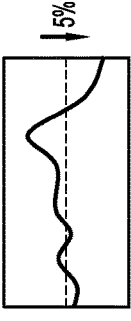
FIG. 8 shows a second UI screen that shows policy efficacy, including hit rates, displayed in connection with operations performed in the method of FIG. 5, according to an example embodiment.

With reference to FIG. 8, there is shown an example UI screen 800 that for visualizing security rule efficacy may be displayed in connection with operations 530-550. UI screen 800 includes a left panel 805, a center panel 810, and a right panel 815. Panel 810 lists various security rules 820 as layer 3 access control lists (ACLs) configured on security devices. Each of security rules 820 is selectable via UI screen 800. A security rule 822 is highlighted to indicate it has been selected. In response to the selection, panel 815 includes a hit rate section 830 that presents a history of the hit rate for selected rule 822 as a hit rate vs. time graph. Hit rate section 830 also indicates a recent change in the hit rate, i.e., the most recently computed hit rate is down 5 percent from the previously computed hit rate.

Figure 9:
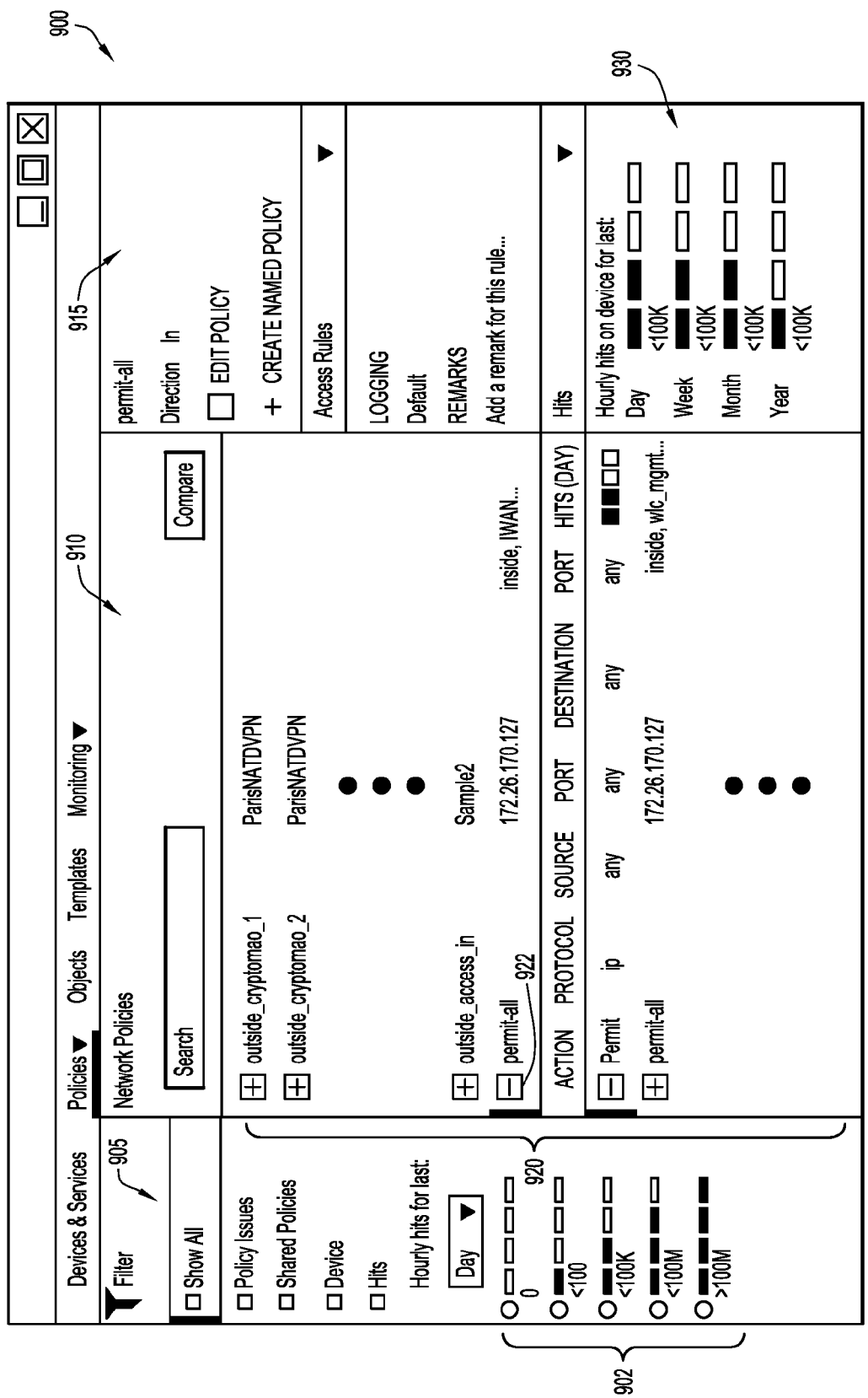
FIG. 9 shows a third UI screen that shows policy efficacy, including hit counts and a display filter, displayed in connection with operations performed in the methods of FIGS. 5 and 6, according to an example embodiment.

With reference to FIG. 9, there is shown an example UI screen 900 for visualizing security rule efficacy that may be displayed in connection with operations 530, 535, 605, and 610. UI screen 900 includes a left panel 905, a center panel 910, and a right panel 915. Panel 905 presents a display filter including different aggregated hit count ranges 907 as selectable options. Panel 910 presents various security rules 920 as layer 3 access control lists (ACLs) configured on different security devices. Each of security rules 920 is selectable via UI screen 900. A security rule 922 is highlighted to indicate it has been selected. In response to the selection, panel 915 presents a hits section 930 that presents most recently aggregated hit counts for the selected security rule per day, week, month, and year. The aggregated hit counts are hit counts for security rule 922 that are aggregated across all of the security devices on which the security is configured. In response to a selection of one of the different hit count ranges 907, panel 910 presents only security rules having respective most recently aggregated hit counts that fall within the selected aggregated hit count range.

With reference to FIG. 10, there is shown an example UI screen 1000 for visualizing security rule efficacy that may be displayed in connection with operations 530-550. UI screen 1000 is an in-line edit screen that lists security rules 1005 on corresponding numbered lines. A security rule 1010 on line 130 has been selected and is therefore highlighted. UI screen 1000 presents hit count and traffic volume indicators 1020 in line with selected security rule 1010. In the in-line editor, information on the hit rate of the selected rule is provided. Also, information on a specific object relating to the selected rule, either the object as a whole or its different parts, may be provided. In addition, an IP address in a security rule may be resolved to its domains and its geographical location information, both when the security rule was defined and currently. If a security rule is based on reputation or location techniques may provide a notification upon a reputation change (if it turns from bad to good or vice versa).

Figure 11:
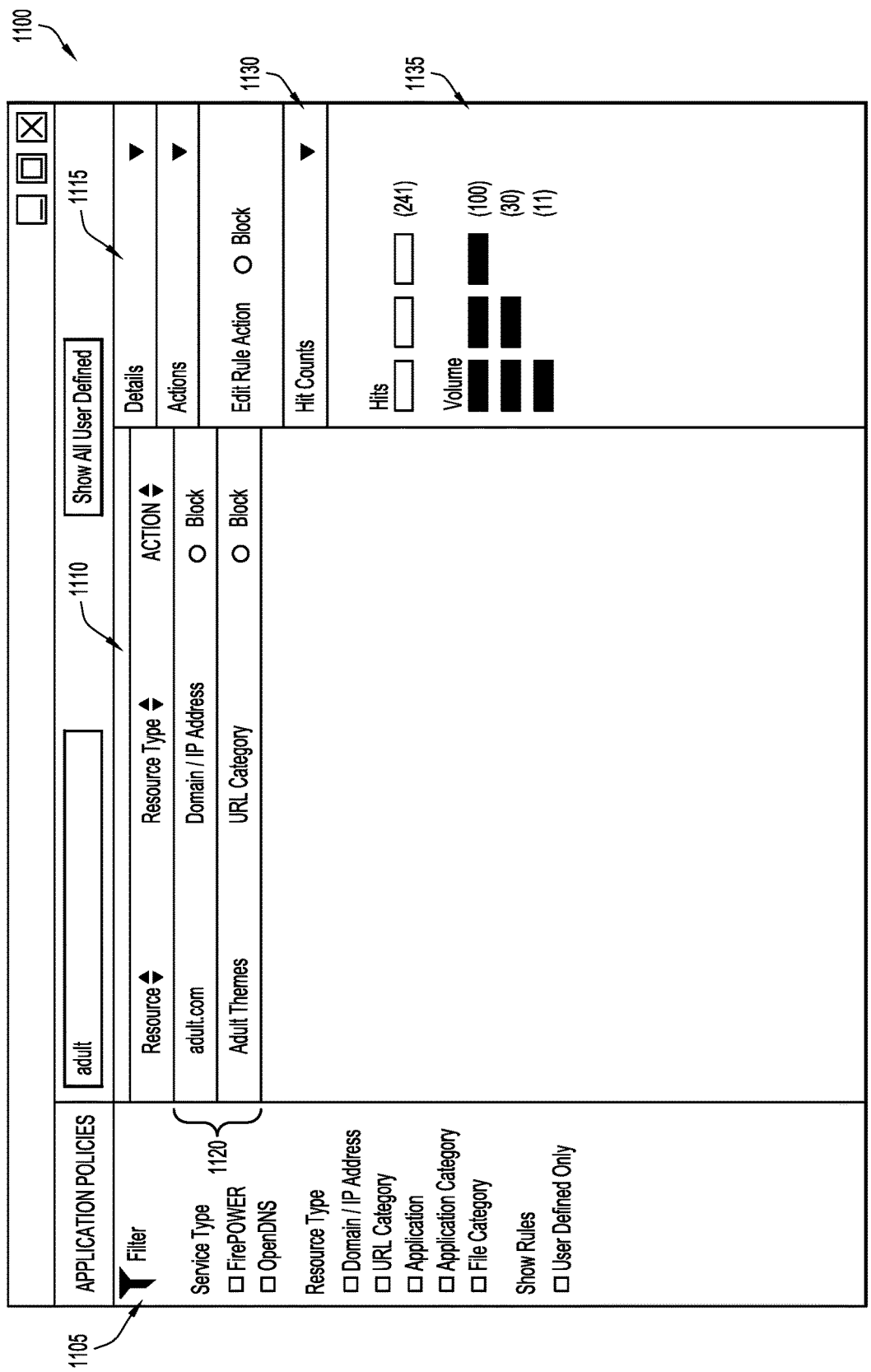
FIG. 11 shows a fifth UI screen that shows policy efficacy, including hit counts and traffic volume associated with high-level security rules, displayed in connection with operations performed in the method of FIG. 5, according to an example embodiment.

With reference to FIG. 11, there is shown an example UI screen 1100 for visualizing security rule efficacy that may be displayed in connection with operations 530-550. UI screen 1100 includes a left panel 1105, a center panel 1110, and a right panel 1115. Panel 1105 presents a display filter. Panel 1110 presents various security rules 1120 as high-level, layer 7 security rules. Each of security rules 1120 is selectable via UI screen 1100. All of security rules 1120 are selected. In response to the selection, panel 1115 presents a hits section 1130 to present most recently aggregated hit counts for the combined security rules, and a volume section 1135 to present traffic volumes for the combined security rules.

With reference to FIG. 12, there is shown an example UI screen 1200 for visualizing security rule efficacy that may be displayed in connection with operations 530-550. UI screen 1200 includes a left panel 1205, a center panel 1210, and a right panel 1215. Panel 1205 presents a display filter including multiple selectable filter options, such as service types, rule action, device types, and locations. Panel 1210 lists various security devices 1220 on which policies are configured. Devices 1220 are listed as selectable options. A device 1222 is highlighted indicated that a user has selected that device. In response to the selection, panel 1215 includes a hits section 1230 that presents most recently aggregated hit counts for the selected device per day, per week, per month, and per year. The aggregated hit counts are hit counts that are aggregated across all security rules configured on selected device 1222 and that have been indicated in the event logs collected from the selected device.

Figure 13:
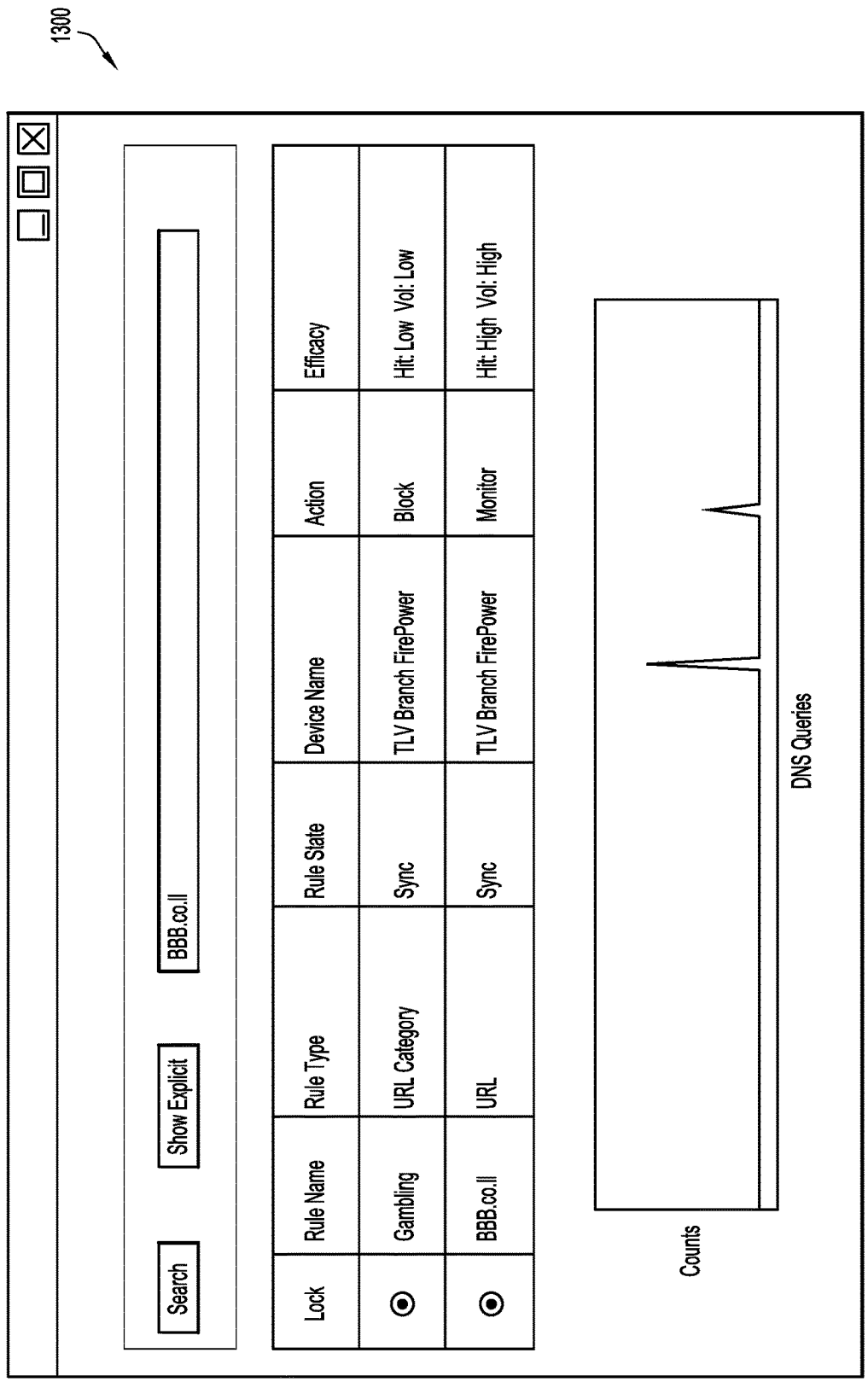
FIG. 13 shows a seventh UI screen that shows policy efficacy displayed in connection with operations performed in the method of FIG. 5, according to an example embodiment.

With reference to FIG. 13, there is shown another example UI screen 1300. On UI screen 1300, a security rules "Gambling" and "888.co.II" are shown, which correspond to a particular gambling site. UI screen 1300 also presents, as shown in the far right column, information, including hit count and traffic volume, associated with the triggering of these security rules across multiple security devices. This provides a simplified high-level view, whether the security rules are working, and if they are working, what are the efficacies of the security rules, across all security devices. A network administrator need not logon to each network security device to attain the efficacy information. A simplified single-click answer is presented at the point on UI screen 1300 where the network administrator is actually editing the security rules so he/she can know quantitative and/or qualitatively how the security rule are working.

Figure 14:
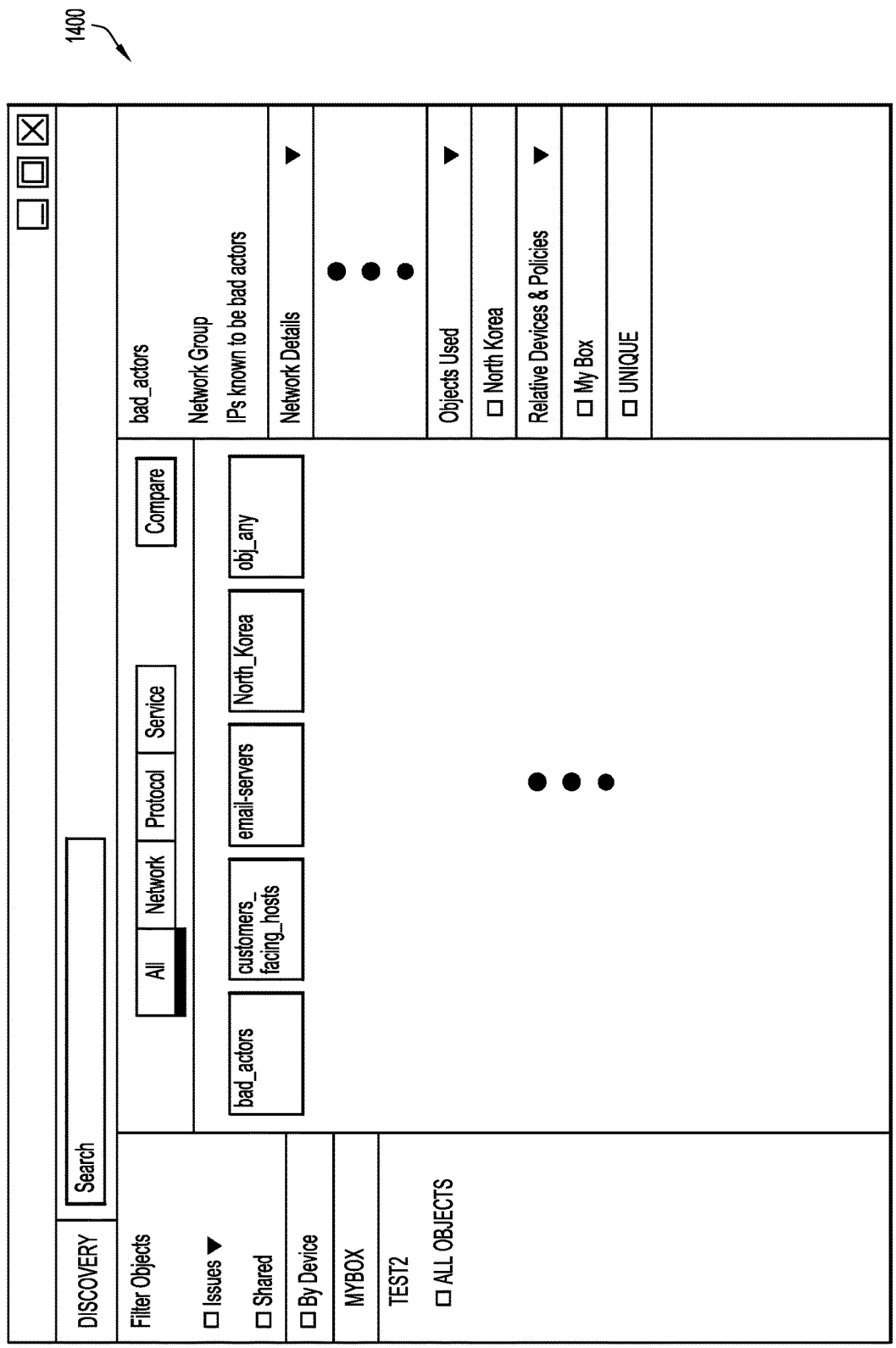
FIG. 14 shows an eighth UI screen that shows policy efficacy displayed in connection with operations performed in the method of FIG. 5, according to an example embodiment.

FIG. 14 shows another example UI screen 1400 where objects and policy (security rule) editors are displayed. In window "Network Details" on the right of UI screen 1400, information can be presented that indicates the efficacy (hit count and volume) associated with IP addresses.

Figure 15:
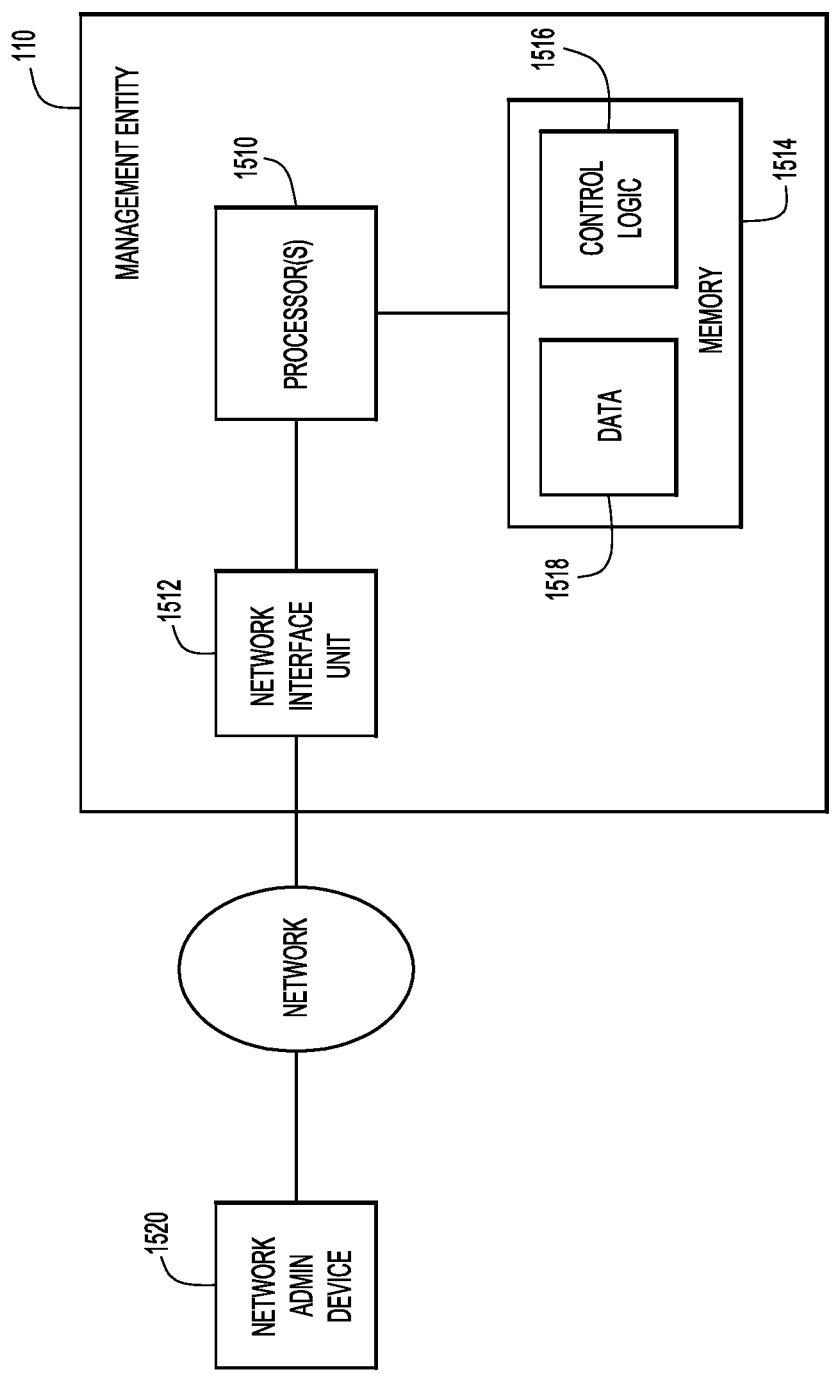
FIG. 15 is a hardware block diagram for the management entity according to an example embodiment.

With reference to FIG. 15, there is shown a hardware block diagram for management entity 110. In an example, management entity 110 includes a computer system, such as a server, having one or more processors 1510, a network interface unit (NIU) 1512, and a memory 1514. Memory 1514 stores control software 1516 (referred as "control logic"), that when executed by the processor(s) 1510, causes the computer system to perform the various operations described herein for management entity 110.

The processor(s) 1510 may be a microprocessor or microcontroller (or multiple instances of such components). The NIU 1512 enables management entity 110 to communicate over wired connections or wirelessly with a network. NIU 1512 may include, for example, an Ethernet card or other interface device having a connection port that enables management entity 110 to communicate over the network via the connection port. In a wireless embodiment, NIU 1512 includes a wireless transceiver and an antenna to transmit and receive wireless communication signals to and from the network.

The memory 1514 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 1514 may comprise one or more tangible (non-transitory) computer readable storage media (e.g., memory device(s)) encoded with software or firmware that comprises computer executable instructions. For example, control software 1516 includes logic to implement modules/processes 320-324, 500, and 600. Thus, control software 1516 implements the various methods/operations described above. Control software 1516 also includes logic to implement/generate for display GUIs as necessary in connection with the above described methods/operations.

Memory 1514 also stores data 1518 generated and used by control software 1516, including collected event logs, security rules, and quantitative/efficacy parameters.

A user, such as a network administrator, may interact with management entity 110, to receive reports, change algorithms, etc., through GUIs by way of a user device 1520 (also referred to as a "network administration device") that connects by way of a network with management entity 110. The user device 1520 may be a personal computer (laptop, desktop), tablet computer, SmartPhone, etc., with user input and output devices, such as a display, keyboard, mouse, and so on. Alternatively, the functionality and a display associated with user device 1520 may be provided local to or integrated with management entity 110.

In summary, techniques presented herein add an ability to visualize whether a security rule is in active use at a current time or over a given time frame. The techniques also provide information on trends and context with relation to other security policy enforcement points. The techniques may be used in the context of layer 3 enforcement points (e.g. at an application security appliance (ASA), a firewall, or an integrated services router (ISR)) as shown in the UI screens described above. The techniques allow viewing of a rule on a single security device, a group of security devices from the same class that have implemented the same rule and outliers of a group (all devices that do not have hits on the rule). The techniques permit policy optimization and troubleshooting of many deployed security devices. The techniques can indicate if all security devices configured with a security rule are implementing the rule correctly, of if some of the security devices have security rule configuration issues or have different deployments.

The techniques presented herein also provide layer 7 policy editors and related UI screens that allow a user defining a policy to know if an imminent change to a rule will have any effect on current traffic. The layer 7 rule may be enforced on group or risk, so the view expands into a coalesced view, including IP and Domain Name System (DNS) queries, to allow a user to view how a category change will effect traffic to current destinations. For example, before blocking cloud file sharing, it is useful to see in an enterprise whether a sales department is using box, the CEO is using iCloud (legitimate activity), while interns are using dropbox (illegitimate activity). So, based on such views, administrators may block file sharing, while allowing for exception to not disrupt activity.

The techniques presented herein visualize efficacy of security rules actually evoked/triggered on the same UI screen where the security rules are edited and which therefore warns against rule changes that disable high use rules. In other words, the techniques display, at a place where a user (network administrator) makes policy changes, whether this policy is active (has been triggered) or not, and if active, how active (how many times it is triggered and the metadata associated with the triggering of the policy). All of this data is pulled into a single view/UI screen and is updated in real-time as time progresses, to avoid static, snapshot-in-time only data. This allows the network administrator to know if a security policy is working as it was intended. The techniques also present time frame/interval and trend information. The techniques present a UI screen that generates security rule reports that are easy to correlate across security devices and access groups.

In summary, in one aspect, a method is provided comprising: at a management entity configured to communicate over a network with devices on which security rules are configured to control network access: repeatedly collecting from the devices data that indicates a hit count for each security rule across the devices as a number of times each security rule is triggered to control network access; aggregating the hit counts for each security rule over different repeating time intervals to produce repeatedly aggregated hit counts for respective ones of the different repeating time intervals; and, concurrent with the repeatedly collecting and the aggregating: generating for display on a user interface screen the security rules as selectable options; responsive to a selection of one of the security rules, generating for concurrent display on the user interface screen a selected security rule and most recently aggregated hit counts for the different repeating time intervals for the selected security rule; and updating display of the most recently aggregated hit counts for the selected security rule as time progresses.

In another aspect, an apparatus is provided comprising: a network interface unit to communicate over a network with devices on which security rules are configured to control network access; and a processor coupled with the network interface unit and configured to: repeatedly collect from the devices data that indicates a hit count for each security rule across the devices as a number of times each security rule is triggered to control network access; aggregate the hit counts for each security rule over different repeating time intervals to produce repeatedly aggregated hit counts for respective ones of the different repeating time intervals; and, concurrent with the operation to repeatedly collect and the operation to aggregate: generate for display on a user interface screen the security rules as selectable options; responsive to a selection of one of the security rules, generate for concurrent display on the user interface screen a selected security rule and most recently aggregated hit counts for the different repeating time intervals for the selected security rule; and update display of the most recently aggregated hit counts for the selected security rule as time progresses.

In another aspect, a non-transitory computer readable storage medium encoded with instructions is provided. The instructions, when executed by a processor of a management entity configured to communicate over a network with devices on which security rules are configured to control network access, cause the processor to: repeatedly collect from the devices data that indicates a hit count for each security rule across the devices as a number of times each security rule is triggered to control network access; aggregate the hit counts for each security rule over different repeating time intervals to produce repeatedly aggregated hit counts for respective ones of the different repeating time intervals; and, concurrent with the operation to repeatedly collect and the operation to aggregate: generate for display on a user interface screen the security rules as selectable options; responsive to a selection of one of the security rules, generate for concurrent display on the user interface screen the selected security rule and most recently aggregated hit counts for the different repeating time intervals for the selected security rule; and update display of the most recently aggregated hit counts for the selected security rule as time progresses.

The above description is intended by way of example only. Various modifications and structural changes may be made therein without departing from the scope of the concepts described herein and within the scope and range of equivalents of the claims.

What is claimed is:

1. A method comprising:
   at a management entity configured to communicate over a network with devices on which security rules are configured to control network access, repeatedly collecting from the devices data that indicates a hit count for each security rule across the devices as a number of times each security rule is triggered to control network access;
   aggregating the hit counts for each security rule over different repeating time intervals to produce repeatedly aggregated hit counts for respective ones of the different repeating time intervals; and
   concurrent with the repeatedly collecting and the aggregating:
      generating for display on a user interface screen the security rules as selectable options;
      computing hit rates for each security rule as hit counts for the security rule over respective ones of successive hit rate time intervals, to produce a respective hit rate for each hit rate time interval;
      responsive to a selection of one of the security rules, generating for concurrent display on the user interface screen a selected security rule, a most recently aggregated hit counts for the different repeating time intervals for the selected security rule and an indication of the hit rates for the selected security rule; and
      updating display of the most recently aggregated hit counts and indication of hit rates for the selected security rule as time progresses.

2. The method of claim 1, wherein the different repeating time intervals include time overlapping daily, weekly, and monthly intervals.

3. The method of claim 1, wherein the indication of hit rates includes an indication of how the hit rates vary over time.

4. The method of claim 1, further comprising:
   determining whether the respective hit rate computed for each hit rate interval for the selected security rule is equal to or below a hit rate threshold; and
   when it is determined that the hit rate is equal to or below the hit rate threshold, the generating for concurrent display includes generating for concurrent display on the user interface screen the indication of the hit rates for the selected security rule along with an indication that the hit rate is equal to or below the hit rate threshold.

5. The method of claim 1, wherein the user interface screen is configured to permit editing of the security rules, and the method further comprises, concurrent with the repeatedly collecting and the aggregating:
   receiving edits to the selected rule through the user interface screen;
   after receiving the edits, continuing the updating the display of the most recently aggregated hit counts and the indication of the hit rates for the selected security rule as time progresses.

6. The method of claim 1, wherein the user interface screen is configured to permit editing of the security rules, and the method further comprises, concurrent with the repeatedly collecting and the aggregating:
   adding a new security rule based on input received via the user interface screen; and
   after the new security rule is added, the generating for concurrent display includes generating for concurrent display on the user interface screen the new security rule, most recently aggregated hit counts for the different repeating time intervals for the new security rule, and an indication of hit rates for the new security rule; and
   the updating includes updating display of the most recently aggregated hit counts and the indication of the hit rates for the new security rule as time progresses.

7. The method of claim 1, wherein the data further indicates a volume of network traffic, if any, associated with each security rule when triggered to control the network access, the method further comprising, concurrent with the repeatedly collecting and the aggregating:
   aggregating, across the devices, the volume of network traffic for each security rule; and
   responsive to the selection of the one of the security rules, the generating for concurrent display includes generating for concurrent display on the user interface screen the selected security rule, the most recently aggregated hit counts for the selected security rule, and an indication of the aggregated volume of network traffic associated with the selected security rule.

8. The method of claim 1, further comprising: wherein the generating for concurrent display includes generating for concurrent display on the user interface screen, as selectable options, aggregated hit count ranges associated with a security rule display filter; and further comprising:
   responsive to a selection of one of the hit count ranges, generating for display only one or more of the security rules for which most recently aggregated hit counts fall within the selected aggregated hit count range.

9. The method of claim 1, wherein one or more of the security rules includes a set of rule parameters configured to permit or deny access to a resource based on a network protocol, a source address, and a destination address.

10. The method of claim 1, further comprising:
    combining the aggregated hit counts for various ones of the security rules encompassed by a high level security rule; and wherein the generating for concurrent display includes generating for concurrent display on the user interface screen the high level security rule and the combined aggregated hit counts.

11. An apparatus comprising:
a network interface unit configured to communicate over a network with devices on which security rules are configured to control network access; and
a processor coupled with the network interface unit and configured to:
repeatedly collect from the devices data that indicates a hit count for each security rule across the devices as a number of times each security rule is triggered to control network access;
aggregate the hit counts for each security rule over different repeating time intervals to produce repeatedly aggregated hit counts for respective ones of the different repeating time intervals; and
concurrent with the operation to repeatedly collect and the operation to aggregate:
generate for display on a user interface screen the security rules as selectable options;
compute hit rates for each security rule as hit counts for the security rule over respective ones of successive hit rate time intervals, to produce a respective hit rate for each hit rate time interval;
responsive to a selection of one of the security rules, generate for concurrent display on the user interface screen a selected security rule, a most recently aggregated hit counts for the different repeating time intervals for the selected security rule and an indication of the hit rates for the selected security rule; and
update display of the most recently aggregated hit counts and indication of hit rates for the selected security rule as time progresses.

12. The apparatus of claim 11, wherein the different repeating time intervals include time overlapping daily, weekly, and monthly intervals.

13. The apparatus of claim 11, wherein the user interface screen is configured to permit editing of the security rules, and wherein the processor is further configured to, concurrent with the operation to repeatedly collect and the operation to aggregate:
receive edits to the selected rule through the user interface screen; and
after receiving the edits, continue to update display of the most recently aggregated hit counts and the indication of the hit rates for the selected security rule as time progresses.

14. The apparatus of claim 11, wherein the data further indicates a volume of network traffic, if any, associated with each security rule when triggered to control the network access, and wherein the processor is further configured to, concurrent with the operation to repeatedly collect and the operation to aggregate:
aggregate, across the devices, the volume of network traffic for each security rule; and
responsive to the selection of the one of the security rules, generate for concurrent display on the user interface screen the selected security rule, the most recently aggregated hit counts for the selected security rule, and an indication of the aggregated volume of network traffic associated with the selected security rule.

15. A non-transitory computer readable storage medium encoded with instructions that, when executed by a processor of a management entity configured to communicate over a network with devices on which security rules are configured to control network access, cause the processor to:
repeatedly collect from the devices data that indicates a hit count for each security rule across the devices as a number of times each security rule is triggered to control network access;
aggregate the hit counts for each security rule over different repeating time intervals to produce repeatedly aggregated hit counts for respective ones of the different repeating time intervals; and
concurrent with the operation to repeatedly collect and the operation to aggregate:
generate for display on a user interface screen the security rules as selectable options;
compute hit rates for each security rule as hit counts for the security rule over respective ones of successive hit rate time intervals, to produce a respective hit rate for each hit rate time interval;
responsive to a selection of one of the security rules, generate for concurrent display on the user interface screen a selected security rule, a most recently aggregated hit counts for the different repeating time intervals for the selected security rule and an indication of the hit rates for the selected security rule; and
update display of the most recently aggregated hit counts and indication of hit rates for the selected security rule as time progresses.

16. The non-transitory computer readable storage medium of claim 15, wherein the different repeating time intervals include time overlapping daily, weekly, and monthly intervals.

17. The non-transitory computer readable storage medium of claim 15, wherein the user interface screen is configured to permit editing of the security rules, further comprising instructions that, when executed by the processor cause the processor to, concurrent with the operation to repeatedly collect and the operation to aggregate:
receive edits to the selected rule through the user interface screen; and
after receiving the edits, continue to update display of the most recently aggregated hit counts and the indication of the hit rates for the selected security rule as time progresses.

18. The apparatus of claim 11, wherein the processor is further configured to:
determine whether the respective hit rate computed for each hit rate interval for the selected security rule is equal to or below a hit rate threshold; and
when it is determined that the hit rate is equal to or below the hit rate threshold, generate for concurrent display on the user interface screen the indication of the hit rates for the selected security rule along with an indication that the hit rate is equal to or below the hit rate threshold.

19. The apparatus of claim 11, wherein one or more of the security rules includes a set of rule parameters configured to permit or deny access to a resource based on a network protocol, a source address, and a destination address.

20. The non-transitory computer readable storage medium of claim 15, further comprising instructions that, when executed by the processor, cause the processor to:
determine whether the respective hit rate computed for each hit rate interval for the selected security rule is equal to or below a hit rate threshold; and when it is determined that the hit rate is equal to or below the hit rate threshold, generate for concurrent display on the user interface screen the indication of the hit rates for the selected security rule along with an indication that the hit rate is equal to or below the hit rate threshold.

\* \* \* \* \*